July 20, 1926.  1,592,871
M. C. SCROTE
BEAD STITCHING AND TRIMMING APPARATUS FOR TIRE BUILDING MACHINES
Filed Feb. 17, 1923  2 Sheets-Sheet 1

Inventor.
Merle C. Scrote
By Robert McPherson
Atty

July 20, 1926.
M. C. SCROTE
1,592,871
BEAD STITCHING AND TRIMMING APPARATUS FOR TIRE BUILDING MACHINES
Filed Feb. 17, 1923
2 Sheets-Sheet 2
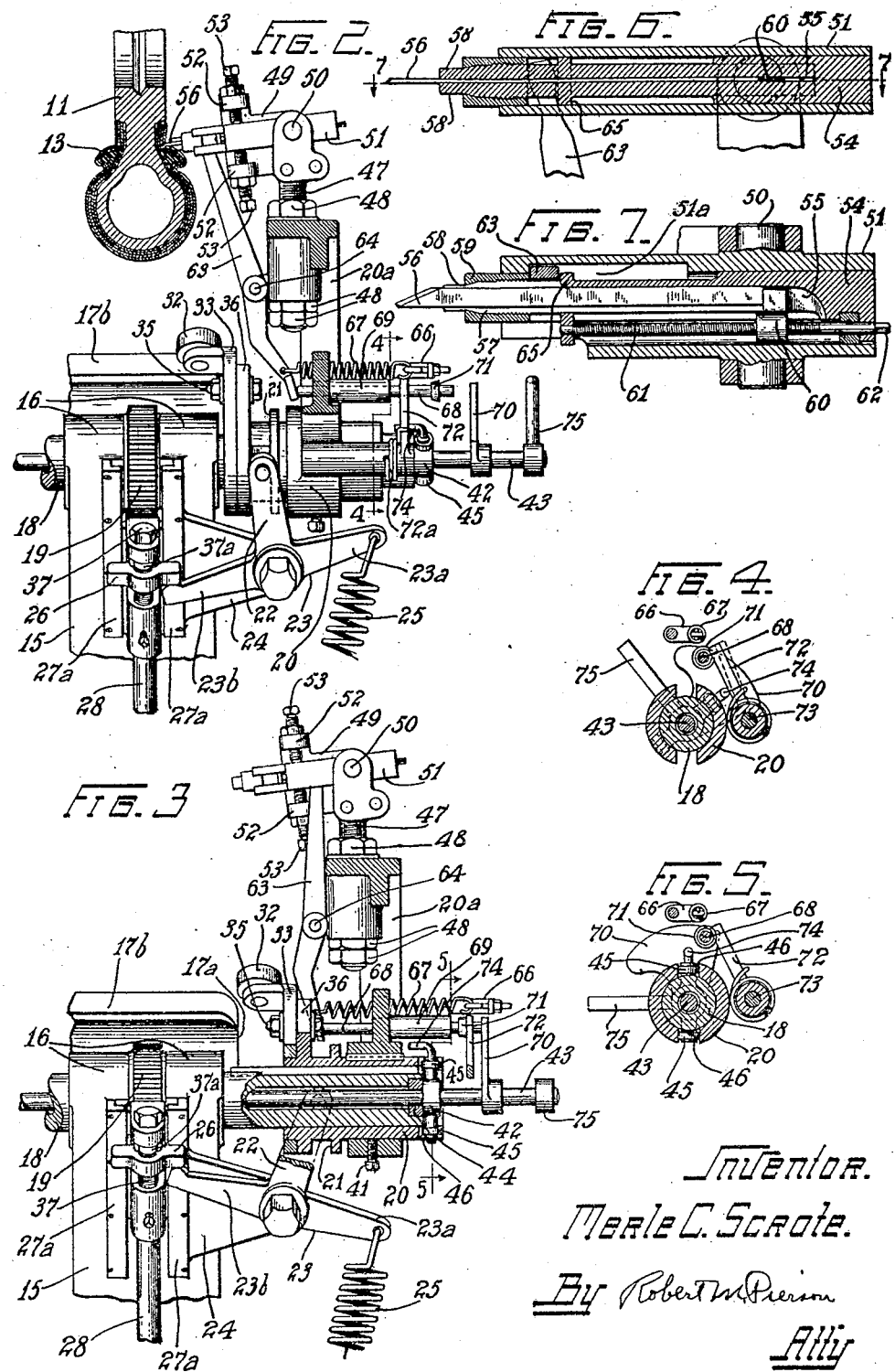
Inventor.
Merle C. Scrote.
By Robert W. Pierson
Atty Patented July 20, 1926.

1,592,871

UNITED STATES PATENT OFFICE.

MERLE C. SCROTE, OF AKRON, OHIO, ASSIGNOR TO THE B. F. GOODRICH COMPANY, OF NEW YORK, N. Y., A CORPORATION OF NEW YORK.

BEAD STITCHING AND TRIMMING APPARATUS FOR TIRE-BUILDING MACHINES.

Application filed February 17, 1923. Serial No. 619,648.

This invention relates to apparatus for pressing or "stitching" the fabric in the bead portions of a pneumatic tire, in the manufacture thereof, and for trimming the excess fabric from such portions of the tire, the device here shown being designed to roll and compact about the bead the plies of fabric which are drawn onto the tire-building core after the bead-core, commonly referred to as the bead, has been applied to the underlying plies of the partly built tire, and to trim the fabric at the toe of the bead.

The chief objects of my invention are to provide improved time and labor saving apparatus for the work mentioned, and particularly to provide largely automatic apparatus and apparatus adapted for very accurate operation upon the tire. Further specific objects are to insure adequate pressure of the bead stitching tools upon the work and to provide a substantially automatic trimming knife for severing the excess fabric around the inner periphery of the bead.

Of the accompanying drawings:

Fig. 2 is a section of the same on line 2—2 of Fig. 1, showing instrumentalities adapted to operate upon one side of the tire, those for the other side being similar thereto.

Fig. 3 is a section similar to that of Fig. 2 but with parts at a different stage of operation.

Figure 1:
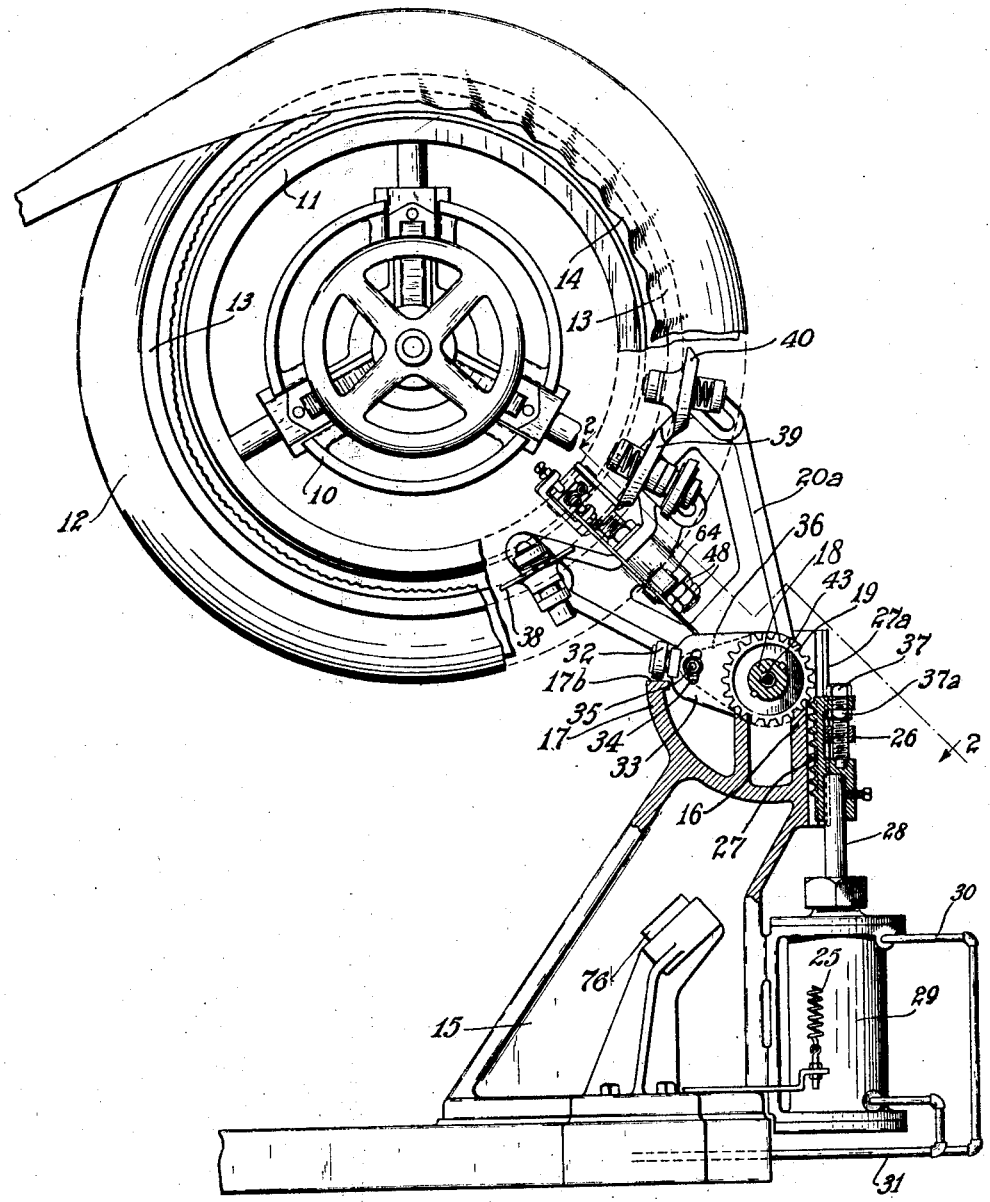
Fig. 1 is an elevation, with parts broken away and in section, of parts of a tire-building machine embodying a preferred form of my apparatus, and the work in place.

Fig. 4 is a section on line 4—4 of Fig. 2.
Fig. 5 is a section on line 5—5 of Fig. 3.
Fig. 6 is a longitudinal section of a holder for a trimming knife, and the knife therein.
Fig. 7 is a longitudinal section of the same taken at 90° from the section of Fig. 6.

Referring to the drawings, 10 is the chuck of a tire-building machine, said chuck being adapted to support and drive a tire-core 11 mounted thereon, and the particular chuck here shown being of the type shown and described in Butler U. S. Patent No. 1,285,928 of November 26, 1918. 12 designates the inner or under-the-bead plies of a partially built tire on said core, 13 is the tire-bead, applied thereto, and 14 is one of the outer or over-the-bead plies.

Mounted upon the floor adjacent to and aligned with the chuck 10 is a standard 15 formed with a bearing fork 16 at its top and, on its portion nearest the chuck, with a cam bracket 17 provided with a pair of L-shaped cam surfaces each having a vertical face, such as $17^a$, disposed concentrically with relation to the bearing of said fork, and a horizontal face, such as $17^b$, at the top thereof, said surfaces being so disposed that the vertical faces $17^a$ prevent their cam followers from closely approaching each other, as they approach the core 10, until said followers pass from the vertical faces $17^a$ onto the horizontal faces $17^b$.

Journaled in the bearing fork 16 is a hollow shaft 18, having a pinion 19 secured thereon between the arms of said fork, and splined on said hollow shaft at each side of the bearing fork 16 is a hub-member 20 carrying a tool-arm $20^a$, adapted to be swung past the outer periphery of the core, into and out of operative position. Said hub member is formed with a circumferential groove 21 in which are mounted the stud members of a shipper fork 22, said fork being formed on one arm of a three-armed lever 23 pivoted on a bracket 24 projecting from the standard 15, the outer arm $23^a$ of said three-armed lever being connected by a pull spring 25 with a stationary member at the base of said standard, to urge the hub-member 20 away from the bearing fork 16, and the inner arm $23^b$ of said lever being adapted to be engaged by a dog 26 adjustably secured upon a rack 27, in the lower part of the latter's stroke, for forcing the hub-member 20 toward the bearing bracket 16 against the force of said spring 25. The rack 27 is adjustably secured upon the upper end of the piston-rod 28 of a vertical fluid-pressure cylinder 29 secured to the base of the standard 15 and provided with pipes 30, 31 at its respective ends for actuating its piston in both directions. The rack 27 is slidably held against the standard 15 by retaining guides $27^a$, $27^a$ and is adapted to mesh with the pinion 19 in the upper portion only of its stroke, when the hub-members 20 are spread apart by the springs 25, for turning the hollow shaft 18 and with it the hub-members 20 splined thereon. Each of said hub-members has a cam roller 32 adjustably secured thereon and adapted to rest upon the horizontal face $17^b$ of the cam member 17 to hold the hub-member 20 in position, while the rack 27 is unmeshed from the gear 19, against the weight of the tool arm 20ᵃ and tools mounted thereon and the force of the work against the latter.

The cam roller 32 is journaled on the outer end of an arm 33 pivoted upon the hub-member 20 and formed with a slot 34 concentric with its pivot, a clamping bolt 35, projecting from an arm 36 formed on said hub member, being mounted in said slot and adapted to hold the cam-roller arm 33 in adjusted angular positions with relation to said hub member, this construction being such that the tool arm 20ᵃ may be accurately adjusted as to its operative position and positively held against the force of the work tending to turn it about its pivot.

The dog 26 is mounted in a recess formed in the back of the rack 27, is threaded upon an adjusting bolt 37 swiveled in said rack, traversing said recess, and provided with a clamping nut 37ᵃ to prevent it from turning from adjusted position, and said dog is adapted slidably to bear upon the retaining guides 27ᵃ to prevent its turning and thus compel it to move upward or downward with relation to the rack when the adjusting bolt 37 is turned.

Journaled upon the tool arm 20ᵃ are tire-working tools 38, 39, 40, adapted to move laterally against the work, to press the over-the-bead plies of fabric, 14, about the bead 13, when the tool arms are brought together by action of the dog 26 upon the levers 23, the cam rollers 32 running upon the horizontal faces 17ᵇ of the cam 17, after the rack 27, in its downward stroke, has swung the tool arms upward into operative position by driving the pinion 19 and has passed out of mesh with said pinion. The inner end of each tool arm 20ᵃ is apertured, slidably keyed upon its hub-member 20, and provided with a set screw 41 whereby it may be secured in adjusted positions lengthwise of said hub-member, to adapt it for tires of different cross-sectional diameter. For limiting the outward movement of the hub-member and tool arm, a stop-member 42 is secured upon a rock-shaft 43 extending through and projecting from each end of the hollow shaft 18, said rock-shaft being rotatably mounted in bushings, such as 44, mounted in counter-bores in the respective ends of said hollow shaft, and said stop member being provided at its ends with cam rollers 45, 45 adapted to be abutted by the bottom faces of notches 46, 46 formed in the end of the hub-member 20, and so to limit the outward movement of the hub member effected by the spring 25.

My improved trimming mechanism comprises a radially disposed bolt 47 mounted on and projecting from the outer end of the tool-arm 20ᵃ, said bolt being provided with nuts, 48, 48 for securing it in adjusted positions. Secured on the outer end of said bolt is a bracket 49 of special shape, having a bearing fork in which is pivoted at 50, a knife holding sleeve 51 and having a pair of parallel, projecting ears 52, 52 provided with opposed set screws 53, 53, the latter being adapted to adjust the knife-holding sleeve 51 about its pivot 50, to vary its angle to the plane of the core 11, while adjustment of the knife-holder from and toward the axis of the chuck 10, as in adapting it for tires of different sizes, may be effected by adjustment of bolt 47.

Slidably mounted in the knife-holding sleeve 51 is a slide 54 formed with a lengthwise, knife-seating recess 55 in which is clamped a bead-trimming knife 56, the front end of said slide being tapered, split, as indicated at 57, 57 to provide knife-clamping jaws, 58, 58, externally threaded, and provided with a clamping nut 59 slidably fitting within the sleeve 51 and formed with a clamping flange complemental to the tapered surface of the clamping jaws 58 and adapted to spring the latter together upon the knife when said nut is set up. For preventing recession of the trimming knife 56 in the slide 54, or for setting it forward as it wears away at the point, a dog 60 is threaded upon a worm-shaft 61 swiveled in the slide 54, said dog having a portion projecting into the recess 55 and adapted to abut the rear end of the knife 56, the exposed rear end of said worm-shaft being squared, as shown at 62, to receive a wrench.

For projecting the knife 56 into operative position against the tire core and retracting it therefrom, a two-armed lever 63 is pivoted at 64 on the tool arm 20ᵃ, the outer end of said lever extending through an opening 51ᵃ in the sleeve 51 and being mounted between the clamping nut 59 and a flange 65 projecting from the slide 54, by engagement with which nut and flange respectively said lever is adapted to move the slide 54, and the knife therein, toward and from the tire core. The opposite end of said lever is connected with a bracket 66, secured to the tool arm, by a pull spring 67, said spring always urging the knife in the direction of the core. Means are provided for retracting the knife, toward the sleeve 51, against the force of the spring 67 and latching it in such retracted position, between trimming operations, so that it will clear the work as the tool arm is moved. Said knife-retracting and latching means comprises a slide bolt 68 mounted in a guide-boss 69 formed on the tool arm, said slide-bolt being adapted at one end to abut the inner end of the lever 63, and, when the tool arm moves laterally away from the core, to abut, at its other end, a segmental plate 70 secured upon the rock-shaft 43, said plate being adapted to stop said slide bolt so that continued outward movement of the tool arm, under action of the spring 25, overcomes the force of the spring 67, the slide-bolt 68 actuating the lever 63 to retract the knife. For latching the knife in retracted position, the slide bolt 68 is provided near its outer end with a flange 71 having a beveled face and a radial face, so as to act as a cam-latch member in relation to a latching pawl 72 pivoted at 73 on a projection from the tool arm, said pawl being backed by a spring 72ª adapted to urge it into latching position back of the flange 71, as shown in Figs. 3 and 5, after being lifted by and passing over the beveled face of said flange, and to remain in latching position while the tool arm swings downward away from the core and also while said arm is subsequently raised and moved inward toward the core, the pawl, slide-bolt 68 and other parts carried by the tool arm all moving together in such inward movement and said slide-bolt, being latched by the pawl, leaving the segmental plate 70, and the spring 67 being under tension.

For tripping said pawl to permit the spring 67 to project the knife against the core, the stop member 42, secured upon the rock-shaft 43 as above described, is provided at one end with a finger 74 adapted to lift said pawl when said rock-shaft is turned, the lifted position of the pawl being shown in dotted lines in Fig. 4. The rock-shaft is provided with a handle 75 for this operation, the weight of said handle being such as normally to hold the finger 74 away from the pawl. The segmental plate 70 is adapted to stop and prevent ejection of the slide-bolt 68 by the spring 67 upon the tripping of the latching mechanism, the parts then being in the relative positions shown in Fig. 4.

The cam rollers 45 on the ends of the stop member 42 are adapted to enter the cam notches 46 in the end of the hub-member 20 when the latter moves outward, to prevent the tripping of the knife when the tool arm is in its outward position, as it is while being lowered from or raised to operative position. The arms of the stop-member 42 extend through notches in the end of the hollow shaft 18, said notches permitting such limited movement of the rock-shaft as is required to trip the pawl but not such movement as would result in the cam rollers 45 failing to reenter their notches 46 in the hub-member in the subsequent outward movement of the latter. A cushioned abutment, such as is shown at 76, Fig. 1, is provided on each side of the standard 15 to stop the respective tool arms in their position of rest.

In the operation of the apparatus, the tool arms resting upon their stops 76, the rack 27 being at its uppermost position, in mesh with the pinion 19, the lower end of the cylinder 29 being charged, the knife 56 being latched in retracted position, and the tire carcass having been built, upon the core 10, to the stage at which the over-the-bead plies are to be pressed onto and about the bead 13, the cylinder 29 is reversed, whereupon the downwardly moving rack 27 drives the pinion 19 in the first part of its stroke to swing the tool arms upward to operative position, the spring 25 holding the hub member 20 against the cam rollers 45 of the stop member 42, the dog 26 being above and out of contact with the lever arm 23ᵇ, and the cam roller 32 passing upward along the vertical face 17ª of the cam 17, but not necessarily in contact therewith. When said roller has reached the curved junction of said face with the horizontal cam faces 17ᵇ the dog 26 engages the lever arm 23ᵇ and draws the hub-member 20 with the tool arm and associated parts inward to force the tire working tools 38, 39, 40 against the work. As the cam roller 32 passes onto the horizontal cam face 17ᵇ in this movement the rack 27 passes out of mesh with its pinion 19, so that the tool arm is then supported at the proper elevation by said cam face. The upper end of the cylinder 29 remains charged to press the tools against the work while the core is rotated, the over-the-bead plies being thereby rolled about the bead.

In moving inward the hub-member 20 leaves the stop member 42, and carries with it the latched trimming mechanism. When the rolling operation has so far progressed as to fit the fabric snugly about the bead, the trimming mechanism is tripped by lifting the handle 75, whereupon the spring 67 throws the trimming knife into operative position, shown in Fig. 2, where it trims the excess fabric from the toe of the bead during continued rotation of the core. This operation completed, the cylinder 29 is reversed, and in the first part of the upward stroke of the rack the spring 25 is permitted by the recession of the dog 26 to move the tool arm laterally away from the core, and as the roller 32 reaches the end of the cam face 17ᵇ the rack meshes with the pinion 19 so that the cylinder 29 cushions the fall of the tool arm to its inoperative position against its stop 76. The trimming mechanism is automatically reset and latched during the outward and downward movement of the tool arm, as will be clear from the foregoing description, so that the apparatus is ready for a repetition of the cycle of operations described.

It will be understood that the similar mechanism mounted upon the opposite end portion of the shaft 18 operates simultaneously and in the same manner, to roll and trim the opposite bead, and that both trimming knives are tripped by the turning of the handle 75. An advantage of the embodiment of my invention shown in the accompanying drawings is that the tool carrying structures, when not in operative position, lie below the core, out of the way.

Modifications may be resorted to within the scope of my invention, and I do not wholly limit my claims to the specific embodiment shown.

I claim:

1. Tire-building apparatus comprising means for rotatably supporting a tire-core in a vertical plane, a tire-core thereon, a tool-carrying structure having an operative position at the side of said core and a resting position below said core, and a reciprocating drive member adapted by a single, straight movement in one direction to elevate said structure and force it laterally toward the core and by its return movement to withdraw said structure laterally from the core and permit it to return to its position of rest below the core.

2. Tire-building apparatus comprising means for rotatably supporting a tire-core, a tire-core thereon, a shaft mounted adjacent said core and transverse thereto, a tool arm non-rotatably mounted on said shaft and having its tool-carrying portion adapted to move laterally of the core, a power actuated driving member adapted by a single movement to swing said arm to operative position by driving said shaft and to force its tool-carrying portion laterally toward the core with a determinate yielding pressure.

3. Tire-building apparatus comprising means for rotatably supporting a tire-core, a tire-core thereon, a shaft journaled adjacent said core and transverse thereto, a tool arm non-rotatably and slidably mounted on said shaft and adapted to be swung approximately to operative position at the side of said core, and a drive member adapted in the first part of its movement to drive said shaft and to so swing said arm and in the latter part of the same movement to slide said arm on said shaft to force it laterally toward said core.

4. Tire-building apparatus comprising means for rotatably supporting a tire-core, a tire-core thereon, a shaft journaled adjacent said core and transverse thereto, a pair of tool arms non-rotatably mounted on said shaft but having their tool-carrying portions adapted to move laterally of the tire-core, a pinion secured to said shaft, a rack adapted in a part of its stroke to drive said pinion and then pass out of mesh therewith, means on said rack for moving said arms laterally of the core as said rack passes out of mesh with its pinion, and means for preventing said arms from being driven by the work when said rack is unmeshed from its pinion.

5. Tire-building apparatus comprising means for rotatably supporting a tire-core, a tire-core thereon, a shaft journaled adjacent said core on an axis transverse thereto, a tool arm structure non-rotatably and slidably mounted on said shaft, means for driving said shaft to swing said tool-arm structure approximately to operative position at the side of the core, means for sliding said tool-arm structure on said shaft toward the core, and a supporting member adapted to receive said tool-arm structure as it is so slid, to prevent it from being driven by the work.

6. Tire-building apparatus comprising means for rotatably supporting a tire-core, a tire-core thereon, a pivoted tool-carrying structure adapted to be moved past the outer periphery of said core into and out of operative position, a mounting for said tool-carrying structure, a tool mounted on said structure and adapted to be projected and retracted with relation thereto, a spring adapted to urge said tool toward its projected position on said structure, means interposed operatively between said structure and its mounting and adapted by relative movement of the two to retract said tool against the force of said spring and means for moving said structure into and out of operative position.

7. Tire-building apparatus comprising means for rotatably supporting a tire-core, a tire-core thereon, a tool-carrying structure adapted to be moved past the outer periphery of said core and in a direction transverse to said movement, to and from operative position, a trimming knife on said structure adapted to be projected and retracted with relation thereto, a spring on said structure adapted to project said knife, means on said structure, actuated by movement of the latter, for retracting said knife against the force of said spring, means for latching said knife in retracted position, and a driving member adapted to move said structure into and out of operative position.

8. Tire-building apparatus comprising means for rotatably supporting a tire-core, a tire-core thereon, a tool-carrying structure adapted to be presented to the work on said core, a bead trimming knife movably mounted on said structure, yielding means for urging said knife toward its projected, operative position, means actuated by the receding movement of said structure for retracting said knife against the force of said yielding means, and means for latching said knife in its retracted position.

9. Tire-building apparatus comprising means for rotatably supporting a tire-core, a tire-core thereon, a tool-carrying structure adapted to be presented to the work on said core, a bead trimming knife slidably mounted on said structure, yielding means for urging said knife toward its projected, operative position, a lever pivoted on said structure and having one end associated with said knife, means adapted to abut the opposite end of said lever in the receding movement of said structure for retracting said knife, and a latch for holding said lever in its knife-retracted position.

10. Tire-building apparatus comprising means for rotatably supporting a tire-core, a tire-core thereon, a pivotally mounted tool arm structure adapted to be moved laterally of said core and to be swung past the outer periphery of said core into and out of operative position, a mounting therefor, a bead trimming knife mounted on said tool arm structure and adapted to be moved, with relation to said structure, to project it against and retract it from said core, yielding means for urging said knife toward its projected position, and a contact member on said mounting for retracting said knife against the force of said yielding means when said structure is moved laterally away from the core on said mounting.

11. Tire-building apparatus comprising means for rotatably supporting a tire-core, a tire-core thereon, a shaft journaled adjacent said core and transverse thereto, a tool arm mounted on said shaft and having its tool-carrying portion adapted to be moved laterally of the core, means for swinging said tool-arm structure and for moving its tool-carrying portion laterally of the core, a bead-trimming knife mounted on said structure and adapted to be moved thereon to project it against and retract it from the core, yielding means for urging said knife toward the core, and a contact member supported by said shaft for moving said knife with relation to said structure through movement of the tool-carrying portion of the latter with relation to said shaft.

12. Tire-building apparatus comprising means for rotatably supporting a tire-core, a tire-core thereon, a pair of tool-carrying structures adapted to be presented to the work at the respective sides of the core, a bead-trimming knife mounted on each of said structures and adapted to be moved with relation thereto to project the knives against and retract them from the core, yielding means for urging said knives toward their projected positions, means for latching them in their retracted positions against the force of said yielding means, and common means for tripping said latching means.

13. Tire-building apparatus comprising means for rotatably supporting a tire-core, a tire-core thereon, a hollow shaft mounted adjacent said core and transverse thereto, a pair of tool-arm structures mounted on said shaft and adapted to be swung into and out of operative position, a spring-projected bead-trimming knife mounted on each of said structures, an inner shaft journaled in and projecting from the respective ends of said hollow shaft, means on said inner shaft adapted to retract said knives through movement of the knife-carrying portions of said structures with relation to said retracting means, means on said structures for latching said knives in their retracted positions, and means on said inner shaft for tripping the respective latching means.

14. Tire-building apparatus comprising means for rotatably supporting a tire-core, a tire-core thereon, a tool-carrying structure adapted to be presented to said core, a spring-projected bead-trimming knife mounted on said structure, and movable with relation thereto into projected and retracted positions and means for latching said knife in retracted position.

15. Tire building apparatus comprising means for rotatably supporting a tire-core, a tire-core thereon, a tool arm pivoted adjacent said core and adapted to be moved past the outer periphery thereof into and out of operative position, a drive pinion for said tool arm, concentric with the latter's pivot, a fluid pressure cylinder mechanism including a piston rod, and a rack on said piston rod, in extension thereof, and meshed with said pinion.

16. Tire-building apparatus comprising means for rotatably supporting a tire core, a tool-carrying structure adapted to be presented to said core, a spring-projected tool mounted on said structure and movable with relation thereto into projected and retracted positions, and means for holding said tool in retracted position, against the force of said spring, as said structure is presented to the core.

In witness whereof I have hereunto set my hand this 14 day of February, 1923.

MERLE C. SCROTE.